(12) United States Patent
Takano et al.

(10) Patent No.: US 11,758,302 B2
(45) Date of Patent: Sep. 12, 2023

(54) IMAGING DEVICE, IMAGING METHOD, AND ELECTRONIC APPARATUS

(71) Applicant: Sony Semiconductor Solutions Corporation, Kanagawa (JP)

(72) Inventors: Chiaki Takano, Kanagawa (JP); Toshimasa Shimizu, Kanagawa (JP); Yuki Takizawa, Kanagawa (JP); Mark Pude, Honeoye Falls, NY (US); Hirotaka Murakami, Santa Clara, CA (US); Kevin Fronczak, Fairport, NY (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 189 days.

(21) Appl. No.: 17/466,522

(22) Filed: Sep. 3, 2021

(65) Prior Publication Data

US 2023/0070410 A1    Mar. 9, 2023

(51) Int. Cl.
*H04N 25/709*    (2023.01)
*H04N 25/76*    (2023.01)
*H04N 25/71*    (2023.01)
*H04N 23/60*    (2023.01)

(52) U.S. Cl.
CPC ......... *H04N 25/709* (2023.01); *H04N 23/665* (2023.01); *H04N 25/745* (2023.01); *H04N 25/7795* (2023.01)

(58) Field of Classification Search
CPC .... H04N 23/65; H04N 23/651; H04N 23/665; H04N 25/709; H04N 25/74; H04N 25/745; H04N 25/779; H04N 25/7795
See application file for complete search history.

(56) References Cited

U.S. PATENT DOCUMENTS

| 11,477,368 B1* | 10/2022 | Takano ................. G06F 1/324 |
| 2007/0023788 A1 | 2/2007 | Yasui et al. |
| 2015/0234452 A1* | 8/2015 | Heo ........................ G06F 1/26 713/320 |
| 2018/0113502 A1 | 4/2018 | Raja |
| 2020/0333873 A1 | 10/2020 | El Sherif |

FOREIGN PATENT DOCUMENTS

| JP | 2007036916 A | 2/2007 |
| JP | 2010-245506 A | 10/2010 |
| JP | 2013065939 A | 4/2013 |
| JP | 2014160464 A | 9/2014 |
| JP | 2018529939 A | 10/2018 |
| JP | 2019508915 A | 3/2019 |
| JP | 2013084991 A | 4/2019 |
| JP | 2020013264 A | 1/2020 |

\* cited by examiner

*Primary Examiner* — Daniel M Pasiewicz
(74) *Attorney, Agent, or Firm* — Michael Best & Friedrich LLP

(57) ABSTRACT

An imaging device includes a controller, a power supply, a regulator, and a switch. The controller is configured to control an imaging unit, on the basis of a command and data that are received from a host in accordance with an I2C/I3C communication protocol. The power supply is configured to supply a voltage to a digital block of the controller. The digital block is configured to be subjected to dynamic voltage frequency scaling within one-frame operation. The regulator and the switch are provided between the digital block and the power supply, and coupled in parallel with each other.

11 Claims, 5 Drawing Sheets

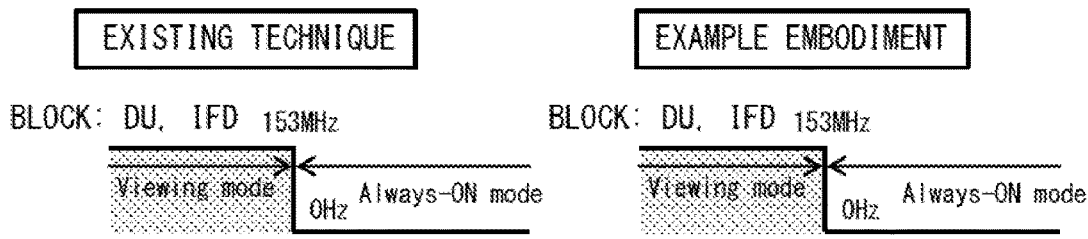
FIG. 1A
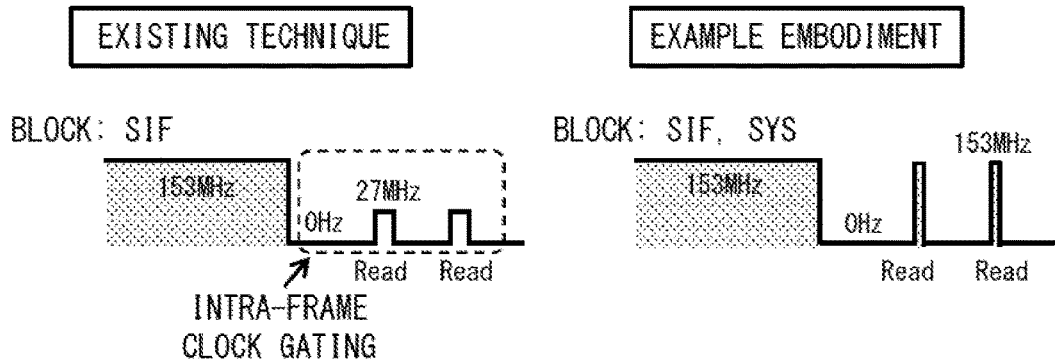
FIG. 1B
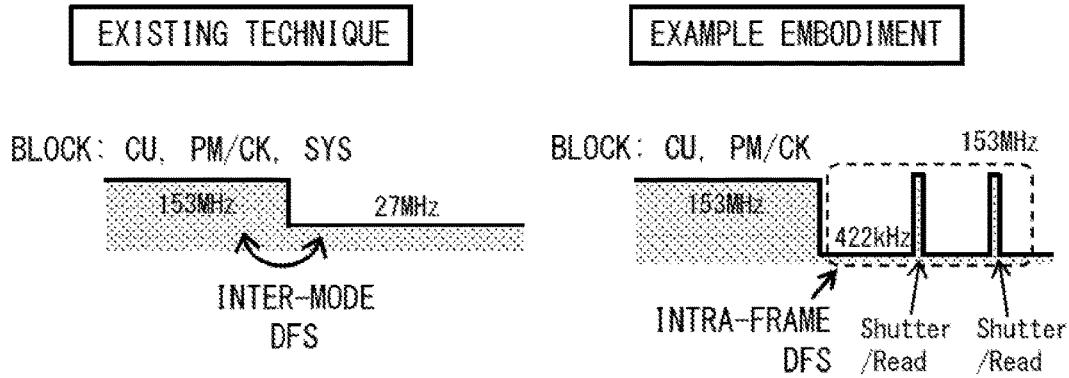
FIG. 1C
| CLOCK CONTROL | INTER-MODE CLOCK GATING | INTER-MODE DFS | INTRA-FRAME CLOCK GATING | INTRA-FRAME DFS |
|---|---|---|---|---|
| EXISTING TECHNIQUE | Yes | Yes | Yes | No |
| EXAMPLE EMBODIMENT | Yes | Yes | Yes | Yes |
FIG. 2

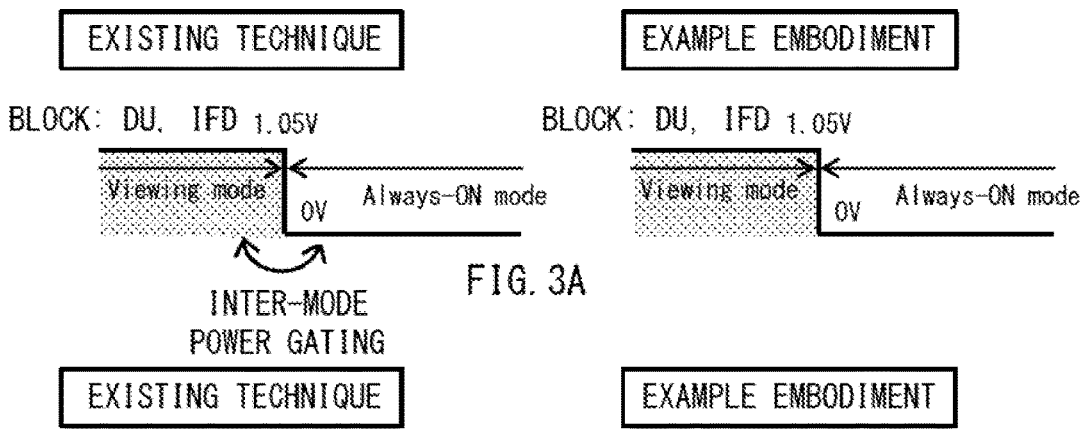
FIG. 3A
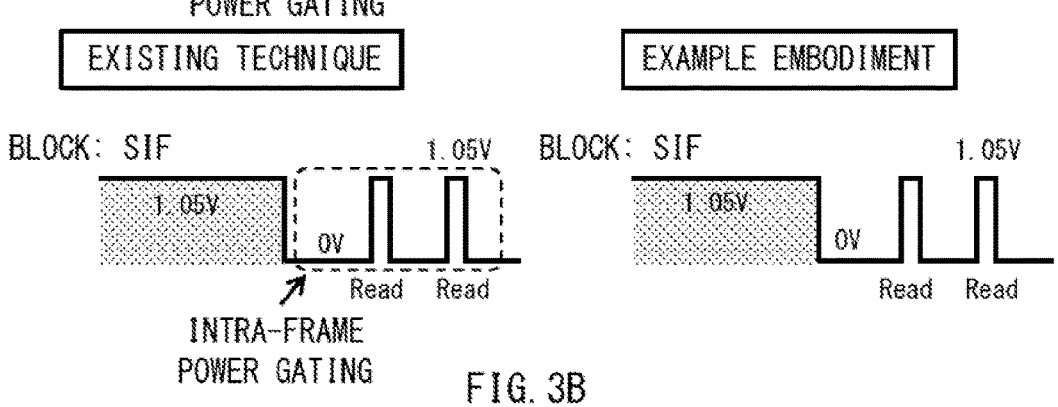
FIG. 3B
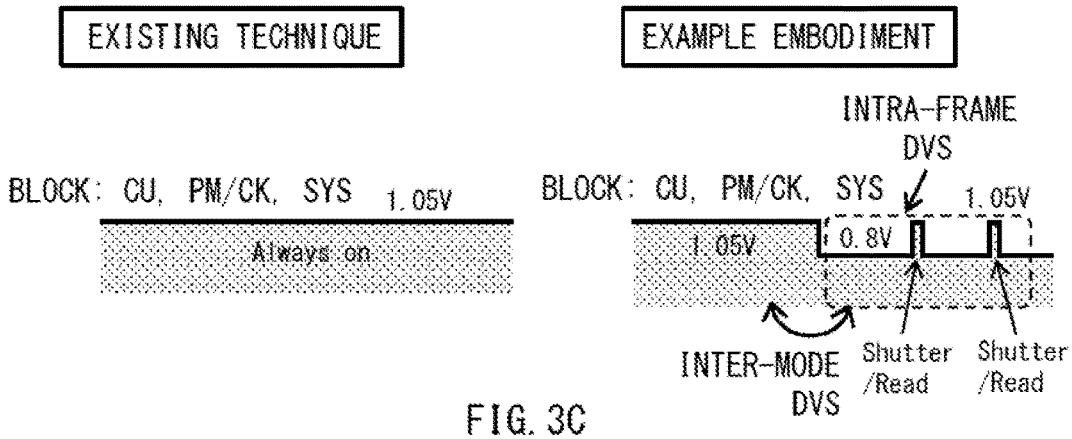
FIG. 3C
| POWER CONTROL | INTER-MODE POWER GATING | INTER-MODE DVS | INTRA-FRAME POWER GATING | INTRA-FRAME DVS |
|---|---|---|---|---|
| EXISTING TECHNIQUE | Yes | NO | Yes | No |
| EXAMPLE EMBODIMENT | Yes | Yes | Yes | Yes |
FIG. 4

IMAGING DEVICE, IMAGING METHOD, AND ELECTRONIC APPARATUS

BACKGROUND

The disclosure relates to an imaging device, an imaging method, and an electronic apparatus.

Recently, imaging devices have seen development in metal oxide semiconductor (MOS) image sensors, such as complementary metal oxide semiconductors (CMOS). For example, Japanese Unexamined Patent Application Publication No. 2010-245506 discloses an imaging device in which a semiconductor wafer having a pixel array portion and a semiconductor wafer having logic circuitry are laminated.

SUMMARY

It has been desired to save power consumption of imaging devices.

It is desirable to provide an imaging device, an imaging method, and an electronic apparatus that make it possible to save power consumption.

An imaging device according to an embodiment of the disclosure includes a controller, a power supply, a regulator, and a switch. The controller is configured to control an imaging unit, on the basis of a command and data that are received from a host in accordance with an I2C/I3C communication protocol. The power supply is configured to supply a voltage to a digital block of the controller. The digital block is configured to be subjected to dynamic voltage frequency scaling (DVFS) within one-frame operation. The regulator and the switch are provided between the digital block and the power supply, and coupled in parallel with each other.

An imaging method according to an embodiment of the disclosure includes: providing a controller configured to control an imaging unit, on the basis of a command and data that are received from a host in accordance with an I2C/I3C communication protocol; and supplying a voltage to a digital block of the controller via a regulator and a switch that are coupled in parallel with each other. The digital block is configured to be subjected to dynamic voltage frequency scaling (DVFS) within one-frame operation.

An electronic apparatus according to an embodiment of the disclosure includes a host, a controller, a power supply, a regulator, and a switch. The host is configured to communicate in accordance with an I2C/I3C communication protocol. The controller is configured to control an imaging unit, on the basis of a command and data that are received from the host in accordance with the I2C/I3C communication protocol. The power supply is configured to supply a voltage to a digital block of the controller. The digital block is configured to be subjected to dynamic voltage frequency scaling (DVFS) within one-frame operation. The regulator and a switch are provided between the digital block and the power supply, and coupled in parallel with each other.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 1A is a diagram illustrating an exemplary temporal change in clock frequency observed when dynamic frequency scaling (DFS) is performed in a CMOS image sensor.

FIG. 1B is a diagram illustrating an exemplary temporal change in clock frequency observed when dynamic frequency scaling (DFS) is performed in the CMOS image sensor.

FIG. 1C is a diagram illustrating an exemplary temporal change in clock frequency observed when dynamic frequency scaling (DFS) is performed in the CMOS image sensor.

FIG. 2 is a table summarizing clock control illustrated in FIGS. 1A to 1C.

FIG. 3A is a diagram illustrating an exemplary temporal change in clock voltage observed when dynamic voltage scaling (DVS) is performed in the CMOS image sensor.

FIG. 3B is a diagram illustrating an exemplary temporal change in clock voltage observed when the dynamic voltage scaling (DVS) is performed in the CMOS image sensor.

FIG. 3C is a diagram illustrating an exemplary temporal change in clock voltage observed when the dynamic voltage scaling (DVS) is performed in the CMOS image sensor.

FIG. 4 is a table summarizing power control illustrated in FIG. 3.

DETAILED DESCRIPTION

Figure 5:
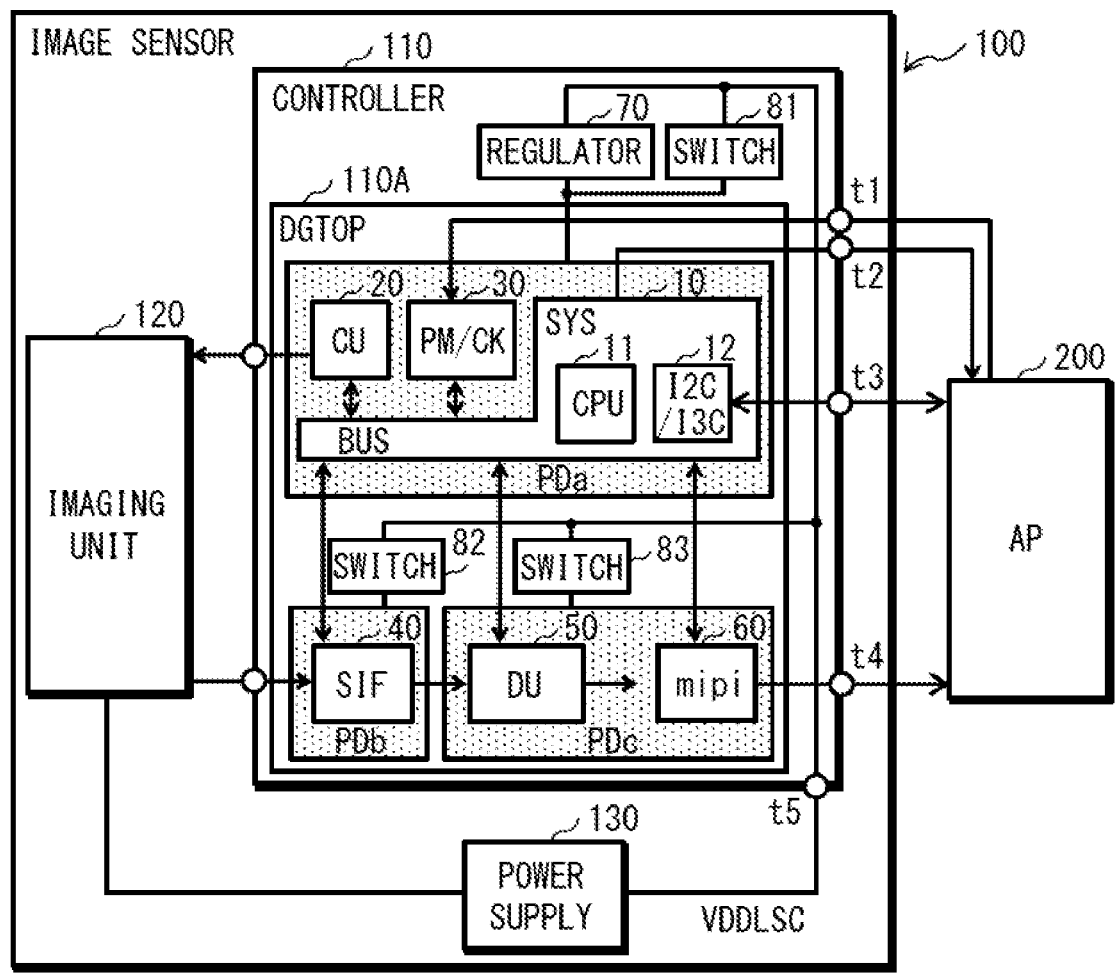
FIG. 5 is a block diagram illustrating an exemplary configuration of an imaging device according to one example embodiment of the disclosure.

Some embodiments of the disclosure will now be described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments that are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals without any redundant description.

1. Intra-Frame DFS and Intra-Frame DVS

Dynamic frequency scaling (DFS) is a technique for saving power consumption by dynamically changing a clock frequency depending on an operation mode to prevent circuitry from operating at an unnecessarily high clock frequency. Unlike clock gating, which involves clock on/off operations, DFS involves raising or lowering a clock frequency. The clock frequency may be changed on the basis of various methods. In some embodiments, the clock frequency may be changed by changing an output frequency of an oscillator that generates a clock. In some embodiments, the clock frequency may be changed by providing a frequency divider downstream of the oscillator to change a frequency division rate. In some embodiments, the clock frequency may be changed by providing a plurality of oscillators different from each other in oscillation frequency and switching between a plurality of clock outputs obtained from those oscillators to use any clock output thereof. The term "oscillator" as used herein may refer to an oscillator that receives an input of a reference clock as with a phase locked loop (PLL), or may refer to an oscillator that performs oscillation alone.

Dynamic voltage scaling (DVS) is a technique that may be combined with DFS to achieve a high power voltage operation when the clock frequency is high, and a low power voltage operation when the clock frequency is low. The combined use of DFS and DVS makes it possible to save more power consumption than the single use of DFS. The combination of DFS and DVS is sometimes called dynamic voltage and frequency scaling (DVFS). Unlike power gating, which involves power on/off operations, DVS involves changing a power voltage.

According to an example embodiment of the disclosure, the power consumed by a CMOS image sensor (CIS) in an always-on mode and a viewing mode in which an image size is small is saved by using DFS and DVS within one-frame operation (hereinafter collectively referred to as "intra-frame DFS"). The always-on mode of the CIS according to the example embodiment of the disclosure refers to a mode in which motion detection is performed within image data with a size of 32×10 (mono), and the viewing mode of the CIS according to the example embodiment of the disclosure refers to a mode in which image data with a size of 320×120 (color) or greater is outputted from a mobile industry processor interface (MIPI) block.

The one-frame operation of the CIS includes the repetition of the following periods (1) to (4):

(1) Shutter period: Resetting photo diodes in pixels (2) Integration (or exposure) period: Photoelectrical conversion of photo diodes (3) Read period: A/D conversion of electric charges of photo diodes (4) V-blanking period: Waiting time until the next frame starts In a case in which a small-size image or a low frame rate is used, such as in the always-on mode or the viewing mode of the VGA image size or less, the shutter period (1) and the read period (3) are relatively short, while the V-blanking period (4) accounts for most of the time of one frame. Thus, saving the power consumption in the V-blanking period (4) leads to a reduction in the mean power of the CIS.

A necessary function to be achieved in the V-blanking period (4) is to simply wait for the start timing of the next frame. Thus, to satisfy the necessary function in the V-blanking period (4), it is sufficient to operate selective blocks by supplying the selective blocks with low-frequency clock signals. In a case of a rolling shutter CIS with a short exposure time, the reading operation of the first line may start before the shuttering operation of the last line completes, in some cases. Thus, the integration period (2) may be absent in some cases. The integration period (2) refers to, rather than the exposure time of each pixel, a period regarding an operational state of the sensor that is simple waiting time from the completion of the shuttering operations for all pixels to the start of the reading operation.

In the case in which a small-size image and low-accuracy ADC are allowable, such as in the always-on mode, the shutter period (1) and the read period (3) are short. Thus, the integration period (2) remains in many cases. In the integration period (2), the time until the reading operation starts is simply counted. Thus, selective blocks may be operated by being supplied with low-frequency clocks. This also effectively saves the power consumption of the CIS in the integration period (2), as in the V-blanking period (4).

According to the CIS of the example embodiment of the disclosure, the V-blanking period (4) and the integration period (2) are the time of waiting until the start of the next frame or the start of the reading while applying only a clock with a frequency of 422 kHz to the circuitry. In the V-blanking period (4) and the integration period (2), clocks are stopped in the CPU and a bus coupled to the CPU. FIGS. 1A to 1C each conceptually represent a change in the clock frequency within one frame. In each of FIGS. 1A to 1C, the CIS according to the example embodiment of the disclosure is illustrated in comparison with an existing CIS. These conceptual diagrams illustrate cases in which the integration period (2) has not remained. According to the existing CIS, intra-frame clock gating is performed in an SIF block described below, and inter-mode DFS is performed in a CU block, a PM/CK block, and an SYS block that are described below. In contrast, according to the CIS of the example embodiment of the disclosure, intra-frame clock gating is performed in the SIF block and the SYS block that are described below, and intra-frame DFS is performed in the CU block and the PM/CK block. The CIS according to the example embodiment of the disclosure features the newly introduced technology which involves inter-mode DFS and also intra-frame DFS in the CU block and the PM/CK block.

FIG. 2 summarizes clock control adopted to the CIS according to the example embodiment of the disclosure. The clock control of the CIS according to the example embodiment of the disclosure features the intra-frame DFS newly introduced.

Operating with only a clock of 422 kHz in the V-blanking period and the integration period, the circuitry may operate with a power voltage much lower than a standard power voltage of 1.05 V. The operational specifications of the CIS according to the example embodiment of the disclosure have been modified to allow for the following usage: all clocks are stopped for a SYSTOP block accommodating a SRAM, and a power voltage necessary only for maintaining the latest condition is supplied to the SYSTOP block in the V-blanking period and the integration period until the next operation starts.

FIGS. 3A to 3C each conceptually represent a change in the power voltage within one frame. According to the existing CIS, the inter-mode power gating is performed in a DU block and an IFD block, intra-frame power gating is performed in the SIF block, and the standard voltage of 1.05 V is constantly supplied to the CU block, the PM/CK block, and the SYS block. In contrast, according to the CIS of the example embodiment of the disclosure, inter-mode DVS and intra-frame DVS are performed in the CU block, the PM/CK block, and the SYS block, instead of constantly supplying the standard voltage. The CIS of the example embodiment of the disclosure features the newly introduced technology which involves inter-mode DVS and intra-frame DVS in the CU block, the PM/CK block, and the SYS block, instead of constantly supplying the standard voltage.

FIG. 4 summarizes the power control adopted in the example embodiment of the disclosure. A technique which involves inter-mode DVS and intra-frame DVS may be newly introduced to the power control of the CIS according to the example embodiment of the disclosure.

In applying DVS, a plurality of logical block layers in the digital block is divided into a plurality of power supply domains. There are the following example ideas for the division.

(1) It is desirable that the number of power supply domains be as small as possible. One reason is that, as the number of power supply domains increases, a degree of freedom in a layout of implementation decreases, and an increase in a chip size and its consequential increase in power are assumed accordingly.

(2) For a block on which power gating is performable from a functional point of view, a power supply domain different from the power supply domain of a block on which the power gating is not performable is allocated.

(3) For blocks in which constant electric power is necessary, DVS is carried out as much as possible. A block on which DVS is performable in the blocks in which the constant electric power is necessary may be classified into the following two types.

A block that is operable even with a low-frequency (422 kHz) clock, and does not raise an issue even when a voltage is lowered.

A block in which electric power for maintaining a state is necessary when the clock is stopped.

An example embodiment of an imaging device having a digital block designed on the basis of such example ideas will be described below.

2. Example Embodiment

FIG. 5 is a block diagram illustrating an exemplary configuration of an imaging device 100 according to an example embodiment of the disclosure. The imaging device 100 may be a low power consumption image sensor. The imaging device 100 includes a controller 110, an imaging unit 120, and a power supply 130. The imaging unit 120 acquires image data through imaging and outputs the acquired image data to the controller 110. The controller 110 is a chip that controls imaging in the imaging unit 120 and outputs the image data obtained through the imaging in the imaging unit 120 to an application processor 200 serving as a host. The power supply 130 supplies various voltages to devices including, for example, the controller 110 and the imaging unit 120.

The controller 110 includes a digital block 110A and an analog block. The digital block 110A includes an SYS block 10, a CU block 20, a PM/CK block 30, a SIF block 40, a DU block 50, and a mipi block 60.

The SIF block 40 is an interface that receives the image data obtained by the imaging unit 120. The SIF block 40 outputs the image data received from the imaging unit 120 to the DU block 50. The DU block 50 performs predetermined image processing on the image data received from the imaging unit 120 via the SIF block 40, and outputs the resultant image data to the mipi block 60. The mipi block 60 communicates with the application processor 200 in accordance with the mipi protocol. The mipi block 60 transmits the image data received from the DU block 50 via a terminal t4 to the application processor 200 in accordance with the mipi protocol, for example.

The SYS block 10 communicates with the application processor 200. The SYS block 10 controls the imaging unit 120 on the basis of an I2C/I3C signal received from the application processor 200 in accordance with the I2C/I3C communication protocol. As used herein, the term "I2C/I3C" means I2C or I3C. The I2C/I3C communication protocol is a protocol for communication between the imaging unit 120 and the application processor 200 that controls the imaging unit 120.

The SYS block 10 includes, for example, a CPU 11 and an I2C/I3C block 12. The CPU 11 controls the imaging unit 120 on the basis of a command and data received from the application processor 200 via the I2C/I3C block 12. The I2C/I3C block 12 communicates with the application processor 200 via a terminal t3 in accordance with the I2C/I3C communication protocol. For example, the I2C/I3C block 12 retrieves a command and data from the I2C/I3C signal received from the application processor 200, and outputs the retrieved command and data to the CPU 11. The CPU 11 and the I2C/I3C block 12 operate on the basis of several types of clock signals transmitted from the PM/CK block 30. The SYS block 10, the CU block 20, and the PM/CK block 30 perform mutual data communication via a bus, for example.

The CU block 20 generates an imaging unit control signal based on a control signal received from the SYS block 10, and outputs the imaging unit control signal to the imaging unit 120. The CU block 20 and the PM/CK block 30 control the start timing and the end timing of each operational state by operating in cooperation with each other. Examples of the operational states controlled by the CU block 20 and the PM/CK block 30 may include the shutter period, the integration period, the read period, and the V-blanking period.

The PM/CK block 30 sets the frequency of one clock signal (hereinafter, simply referred to as "clock frequency") used to operate the SYS block 10 on the basis of a GPI signal received from the application processor 200 via a GPI terminal t1. For example, the PM/CK block 30 determines the polarity of the GPI signal received from the application processor 200 via the GPI terminal t1. The PM/CK block 30 determines the polarity of the GPI signal at the start timing of a predetermined operational state (e.g., the integration period or the V-blanking period), for example. The PM/CK block 30 sets the clock frequency used to operate the SYS block 10 on the basis of the result of the determination. For example, the PM/CK block 30 sets the clock frequency for a predetermined operational state (e.g., the integration period or the V-blanking period) on the basis of the result of the determination. For instance, when the GPI signal has a high polarity, the PM/CK block 30 sets the clock frequency to a relatively high frequency. For instance, when the GPI signal has a low polarity, the PM/CK block 30 sets the clock frequency to a relatively low frequency.

The PM/CK block 30 holds a control signal corresponding to the set clock frequency therein. The PM/CK block 30 includes, for example, a control register that stores control data corresponding to the set clock frequency. When the GPI signal has a low polarity, the PM/CK block 30 may generate a control signal for stopping clock signals and hold the control signal therein, for example. In that case, the PM/CK block 30 may include, for example, a control register that stores control data for stopping clock signals. The PM/CK block 30 may hold a control signal corresponding to the voltage set for each operational state therein. In that case, the PM/CK block 30 may include, for example, an operational state register that stores control data corresponding to the voltage set for each operational state.

The PM/CK block 30 generates a control signal indicating whether or not to apply the intra-frame DFS on the basis of the GPI signal received via a route (the GPI terminal t1)

different from the I2C/I3C communication protocol. For example, the SYS block 10 determines the polarity of the control signal generated by the PM/CK block 30 and indicating whether nor not to apply the intra-frame DFS at the start timing of a predetermined operational state (e.g., the integration period or the V-blanking period). When the result of the determination indicates that the intra-frame DFS is not to be applied, the SYS block 10 generates a low-polarity control signal. The SYS block 10 outputs the low-polarity control signal as a GPO signal to the application processor 200 via a route (the GPO terminal t2) different from the I2C/I3C communication protocol.

Figure 6:
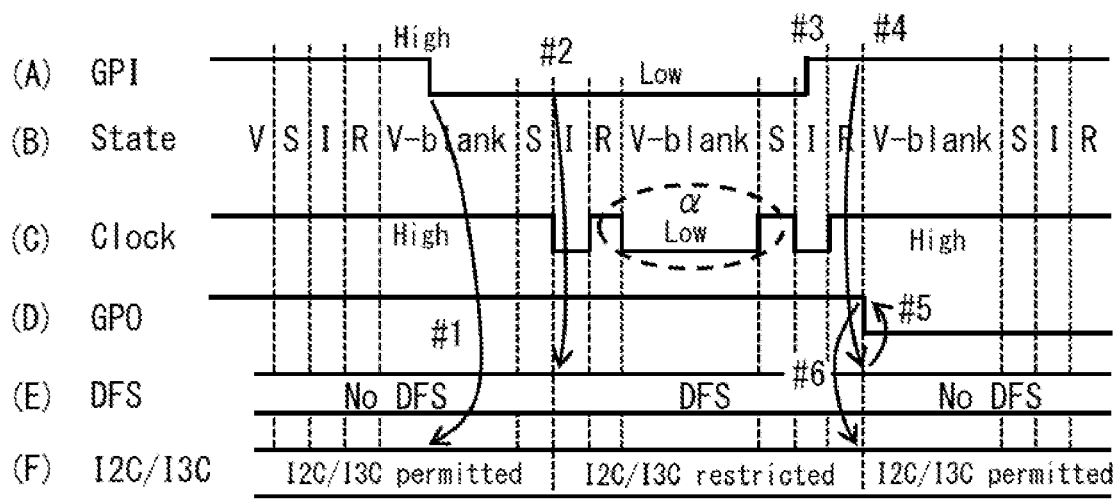
FIG. 6 is a diagram illustrating an exemplary method of controlling DFS in the imaging device illustrated in FIG. 5.

FIG. 6 illustrates an exemplary method of controlling the intra-frame DFS using GPI and GPO. Part (A) of FIG. 6 illustrates the input value of a GPI signal inputted to the GPI terminal t1. Part (B) of FIG. 6 illustrates the operational state of the CIS. In Part (B) of FIG. 6, "V" and "V-blank" denote the V-blanking period, "S" denotes the shutter period, "I" denotes the integration period, and "R" denotes the read period. Part (C) of FIG. 6 illustrates the clock frequency. Part (D) of FIG. 6 illustrates the output value of a GPO signal outputted from the GPO terminal t2. Part (E) of FIG. 6 indicates whether the DFS-applied mode is selected or not. Part (F) of FIG. 6 indicates whether the communication from the application processor 200 via the I2C/I3C block 12 is permitted or not. In the exemplary method of controlling DFS illustrated in FIG. 6, the DFS-unapplied mode is switched to the DFS-applied mode, and the DFS-applied mode is then switched back to the DFS-unapplied mode.

When the operational state is the shutter period or the read period, the SYS block 10 operates regardless of whether DFS is applied or not, as illustrated in Part (C) of FIG. 6, for example. As illustrated in Part (A) of FIG. 6, for example, the application processor 200 instructs the PM/CK block 30 to apply DFS by setting the polarity of the GPI signal to be low (#1). At this time, the PM/CK block 30 does not make DFS applicable immediately. The application processor 200, however, is unable to recognize when the DFS-applied mode starts. Thus, the application processor 200 refrains from communicating via the I2C/I3C block 12 from when the GPI signal is set to the negative (low) polarity.

The PM/CK block 30 reads the GPI signal at a predetermined timing (e.g., #2). When the read GPI signal has a low polarity, the PM/CK block 30 makes a switch to the DFS-applied mode. At this time, the PM/CK block 30 sets the clock frequency to a relatively low frequency, and generates a control signal corresponding to the set clock frequency therein. Thereafter, the PM/CK block 30 outputs a clock having a low frequency on the basis of the control signal. Alternatively, the PM/CK block 30 generates a control signal for stopping clock signals, and stops clocking on the basis of the control signal.

As illustrated in Part (A) of FIG. 6, for example, the application processor 200 instructs the PM/CK block 30 not to apply DFS by setting the polarity of the GPI signal to be high (#3). At this time, the PM/CK block 30 does not make DFS inapplicable immediately. Accordingly, the application processor 200 does not yet start communicating via the I2C/I3C block 12 at this timing.

The PM/CK block 30 reads the GPI signal at a predetermined timing (e.g., #4). When the read GPI signal has a high polarity, the PM/CK block 30 makes a switch to the DFS-unapplied mode. At this time, the PM/CK block 30 sets the clock frequency to a relatively high frequency, and generates a control signal corresponding to the set clock frequency therein. Thereafter, the PM/CK block 30 outputs a clock having a high frequency on the basis of the control signal.

The SYS block 10 outputs a signal to the application processor 200 via a route (the GPO terminal t2) different from the I2C/I3C communication protocol on the basis of the control signal generated by the PM/CK block 30 and indicating whether or not to apply the intra-frame DFS. For example, the SYS block 10 generates a low-polarity signal and outputs the generated low-polarity signal as the GPO signal to the application processor 200 via the GPO terminal t2 (#5). That is, the SYS block 10 toggles the GPO signal at the timing when the DFS-applied mode is switched to the DFS-unapplied mode. The application processor 200 recognizes that DFS has been made inapplicable on the basis of the toggling of the GPO signal acquired via the GPO terminal t2, and starts communicating via the I2C/I3C block 12.

Figure 7:
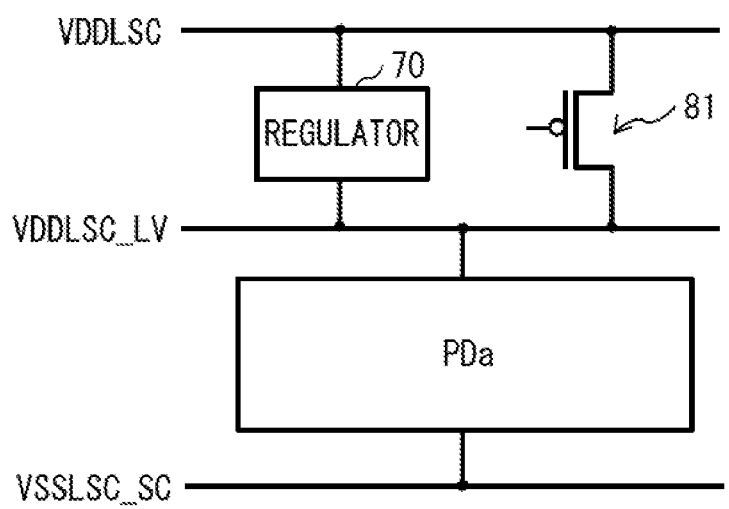
FIG. 7 is a diagram illustrating an exemplary circuit configuration for a supply to a power supply domain PDa illustrated in FIG. 5.

The controller 110 further includes a regulator 70 and switches 81, 82, and 83. For example, as illustrated in FIG. 7, the regulator 70 and the switch 81 are each coupled to a power supply line VDDLSC and a power supply line VDDLSC_LV. The regulator 70 and the switch 81 are coupled in parallel with each other between the power supply line VDDLSC and the power supply line VDDLSC_LV. The power supply line VDDLSC is coupled to the power supply 130, and is provided outside the controller 110. The power supply line VDDLSC_LV is provided inside the controller 110.

The switch 81 connects and disconnects the power supply line VDDLSC and the power supply line VDDLSC_LV. The regulator 70 and the switch 81 are each coupled to the power supply line VDDLSC and a power supply domain PDa as illustrated in FIGS. 5 and 7, for example. The power supply domain PDa is coupled to the power supply lines VDDLSC_LV and VSSLSC_SC. The power supply line VSSLSC_SC receives a supply of a reference voltage (e.g., 0 V) of the controller 110 from the power supply 130 via a terminal t5.

The regulator 70 is a so-called LDO (Low Dropout), and has a circuit that stably outputs a voltage lower than the power supply line VDDLSC. The power supply line VDDLSC receives a supply of a power supply voltage Vdd1 (e.g., 1.05 V) from the power supply 130, for example. The power supply voltage Vdd1 is necessary for normally performing Read/Write in SRAM. The regulator 70 supplies, to the power supply line VDDLSC_LV, the lowest power supply voltage Vdd2 (for example, 0.80 V) that is able to perform a Retention operation of the SRAM (an operation of holding data without performing Read/Write), for example. The power supply voltage Vdd2 may have a magnitude that takes into consideration an error of an output voltage of the regulator 70.

In the controller 110, the digital blocks (the SYS block 10, the CU block 20, and the PM/CK block 30) to be subjected to DFS and DVS (to be subjected to DVFS) are included in the common power supply domain PDa. The CU block 20 and the PM/CK block 30 are blocks that operate with the clock of low frequency (422 kHz) by the execution of DFS and thus operate without raising an issue even when a voltage is lowered. The SYS block 10 is a block in which electric power for maintaining a state is necessary when the clock is stopped.

When the SYS block 10 is operated with the low frequency (422 kHz) clock in the same way as the other blocks, a total power consumption is not greatly affected. Nevertheless, one reason for stopping the clock of the SYS block 10 is that SRAM is provided in the SYS block 10. The SRAM differs from a CMOS standard cell in that the SRAM has a circuit configuration in which an intermediate potential is generated transiently in a bit-line inside the SRAM upon Read/Write, and thus the SRAM is inherently weak in low-voltage operation. However, the SRAM has a property that it is possible to hold data even at a relatively low voltage unless the Read/Write is performed. The CIS according to an example embodiment executes DVS using a retention function that is able to hold data even at a low voltage for the SYS block 10 having the built-in SRAM.

In the controller 110, a digital block (the SIF block 40) that operates only during the read period is included in a power supply domain PDb that is different from the power supply domain PDa. In the power supply domain PDb, intra-frame power gating is performed in the always-on mode. For example, as illustrated in FIG. 5, the switch 82 is coupled to the power supply line VDDLSC and the power supply domain PDb. The switch 82 connects and disconnects the power supply line VDDLSC and the power supply domain PDb, for example. The power supply domain PDb is coupled to the power supply lines VDDLSC_LV and VSSLSC_SC.

In the controller 110, digital blocks (the DU block 50 and the mipi block 60) that are not operated in the always-on mode are included in a power supply domain PDc that is different from the power supply domains PDa and PDb. In the power supply domain PDc, the power gating is performed in the always-on mode. For example, as illustrated in FIG. 5, the switch 83 is coupled to the power supply line VDDLSC and the power supply domain PDc. The switch 83 connects and disconnects the power supply line VDDLSC and the power supply domain PDc, for example. The power supply domain PDc is coupled to the power supply lines VDDLSC_LV and VSSLSC_SC.

The regulator 70 further include a circuit that switches between a low voltage (the power supply voltage Vdd2) and a normal voltage (the power supply voltage Vdd1) as an output voltage. As can be appreciated from FIGS. 1A to 1C and 3A to 3C, a clock frequency is as low as 422 kHz in a period of a low voltage operation. However, in a period of normal voltage operation, the maximum clock frequency becomes a high-speed clock of 153 MHz. Accordingly, the current consumption is large during the normal voltage, and it is necessary to use the regulator 70 having the large area of a current supply electric power in order to cover the current consumption of the power supply domain PDa only by a current supply capability of the regulator 70. In this case, a chip size can become large. To address this, the switch 81 is coupled in parallel with the regulator 70. The switch 81 is turned on during a period in which the clock frequency is high and the consumption current is increased during the normal voltage. Thus, it is possible to perform the normal voltage operation without using the regulator 70.

Figure 8:
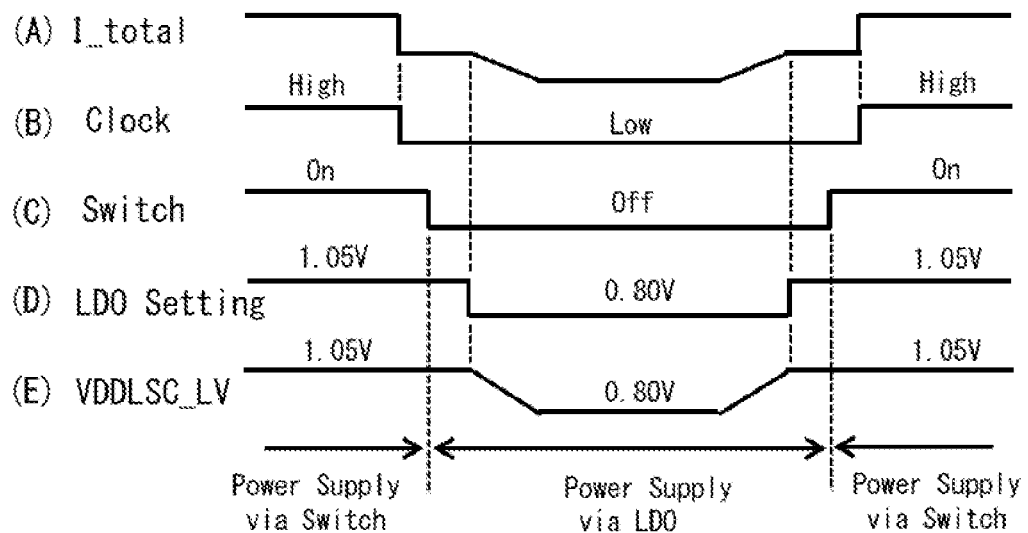
FIG. 8 is a diagram illustrating an example of a method of controlling DVS in a illustrated in FIG. 6.

Parts (A) to (E) of FIG. 8 illustrate an example of a control method of DVS (control method of DVFS) that is performed when the transition of a clock waveform illustrated by a in FIG. 6 is performed (DFS control). Part (A) of FIG. 8 illustrates an example of a current I_total supplied to the power supply domain PDa. Part (B) of FIG. 8 illustrates an example of a clock frequency. Part (C) of FIG. 8 illustrates an example of a signal that controls on/off of the switch 81. Part (D) of FIG. 8 illustrates an example of a signal that sets an output voltage of the regulator 70. Part (E) of FIG. 8 illustrates an example of a voltage of the power supply line VDDLSC_LV.

The PM/CK block 30 sets the clock frequency to high when an operation state is the read period. At this time, the PM/CK block 30 outputs, to the switch 81, a signal that turns on the switch 81. Thus, the switch 81 is turned on when the operation state is the read period, allowing the voltage (the power supply voltage Vdd1) of the power supply line VDDLSC to be supplied to the power supply line VDDLSC_LV (the power supply domain PDa) via the switch 81. The PM/CK block 30 outputs, to the regulator 70, a signal that sets the output voltage of the regulator 70 to the normal voltage (the power supply voltage Vdd1) together with the output, to the switch 81, of the signal that turns on the switch 81 when the operation state is the read period. Thus, even when a current necessary for a supply to the power supply domain PDa exceeds the current supply capability of the regulator 70, the necessary current is supplied from the power supply line VDDLSC to the power supply line VDDLSC_LV (the power supply domain PDa) via the switch 81.

The PM/CK block 30 changes the clock frequency from high to low (#11) by the DFS control when the operation state changes from the read period to the V-blanking period. Accordingly, the current I_total to be supplied to the power supply domain PDa decreases. Thereafter, the PM/CK block 30 outputs, to the switch 81, the signal that turns off the switch 81 (#12). This turns off the switch 81. At this time, the output voltage of the regulator 70 is set to the normal voltage (the power supply voltage Vdd1) as described above. Accordingly, the voltage of the power supply line VDDLSC_LV does not change when the switch 81 is turned off, and the normal voltage, i.e., the power supply voltage Vdd1, is maintained.

Thereafter, the PM/CK block 30 outputs, to the regulator 70, the signal that sets the output voltage of the regulator 70 to the low voltage (the power supply voltage Vdd2) (#13). Thus, the output voltage of the regulator 70 changes from the normal voltage (the power supply voltage Vdd1) to the low voltage (the power supply voltage Vdd2), and the voltage of the power supply line VDDLSC_LV becomes the low voltage (the power supply voltage Vdd2).

Thereafter, the PM/CK block 30 outputs, to the regulator 70, the signal that sets the output voltage of the regulator 70 to the normal voltage (the power supply voltage Vdd1) when a predetermined period has elapsed (#14). Thus, the output voltage of the regulator 70 changes from the low voltage (the power supply voltage Vdd2) to the normal voltage (the power supply voltage Vdd1), and the voltage of the power supply line VDDLSC_LV becomes the normal voltage (the power supply voltage Vdd1).

Thereafter, the PM/CK block 30 outputs, to the switch 81, the signal that turns on the switch 81 (#15). This turns on the switch 81. At this time, the voltage of the power supply line VDDLSC is the normal voltage (the power supply voltage Vdd1). Thereafter, the PM/CK block 30 changes the clock frequency from low to high (#16) by the DFS control when the operation state changes from the V-blanking period to the shutter period. Accordingly, the current I_total to be supplied to the power supply domain PDa increases. At this time, the output voltage of the regulator 70 and the voltage of the power supply line VDDLSC is equal to each other, allowing the voltage of the power supply line VDDLSC_LV to maintain the normal voltage (the power supply voltage Vdd1) without involving a change in its voltage when the switch 81 is turned on.

According to an example embodiment, the change in the clock frequency and the timing of turning on and off the switch 81 are controlled so as to prevent the regulator 70 from necessitating a current supply that exceeds the current supply capability of the regulator 70.

According to an example embodiment, it is possible to control the DFS on the basis of the application processor 200 by using the GPO signal and the GPI signal. Thus, it is possible to achieve an efficient power consumption reduction based on DFS.

According to an example embodiment, the voltage is supplied to the power supply domain PDa via the regulator 70 and the switch 81 that are coupled in parallel with each other. Thus, it is possible to achieve an efficient power consumption reduction based on DVFS.

In some embodiments, the regulator 70 may include: a circuit that outputs a low voltage (the power supply voltage Vdd2) that is lower than the normal voltage (the power supply voltage Vdd1) to be supplied from the power supply 130; and a circuit that switches between the low voltage (the power supply voltage Vdd2) and the normal voltage (the power supply voltage Vdd1) as the output voltage. Thus, it is possible to execute the intra-frame DVFS by controlling the setting of the output voltage of the regulator 70 and on and off of the switch 81. Hence, it is possible to achieve an efficient power consumption reduction based on DVFS.

In some embodiments, upon executing the intra-frame DVFS, the frequency of the clock signal used in the power supply domain PDa may change from high to low, following which the switch 81 may change from on to off, and thereafter the setting of the output voltage of the regulator 70 may be changed from the normal voltage (the power supply voltage Vdd1) to the low voltage (the power supply voltage Vdd2). In some embodiments, upon executing the intra-frame DVFS, the setting of the output voltage of the regulator 70 may be changed from the low voltage (the power supply voltage Vdd2) to the normal voltage (the power supply voltage Vdd1) after a predetermined period has elapsed from the change in the setting of the output voltage of the regulator 70 from the normal voltage (the power supply voltage Vdd1) to the low voltage (the power supply voltage Vdd2), following which the switch 81 may change from off to on and the frequency of the clock signal used in the power supply domain PDa may change from low to high. Thus, the change in the clock frequency and the timing of turning on and off the switch 81 are controlled so as to prevent the regulator 70 from necessitating a current supply that exceeds the current supply capability of the regulator 70. Hence, it is possible to achieve an efficient power consumption reduction based on DVFS.

In some embodiments, the PM/CK block 30, the regulator 70, and the switch 81 may be provided in a single chip. One reason is that the switch 81 is coupled in parallel with the regulator 70 and thus it is possible to control the change in the clock frequency and the timing of turning on and off the switch 81 so as to prevent the regulator 70 from necessitating a current supply that exceeds the current supply capability of the regulator 70. Hence, it is possible to achieve an efficient power consumption reduction based on DVFS.

3. Modification Example

In the example embodiment described above, the CIS is controlled from the application processor 200 by a communication based on the I2C/I3C communication protocol. In some embodiments, a control method using another communication protocol instead of the communication method based on the I2C/I3C communication protocol may be applied in the example embodiment described above.

4. Application Example

Figure 9:
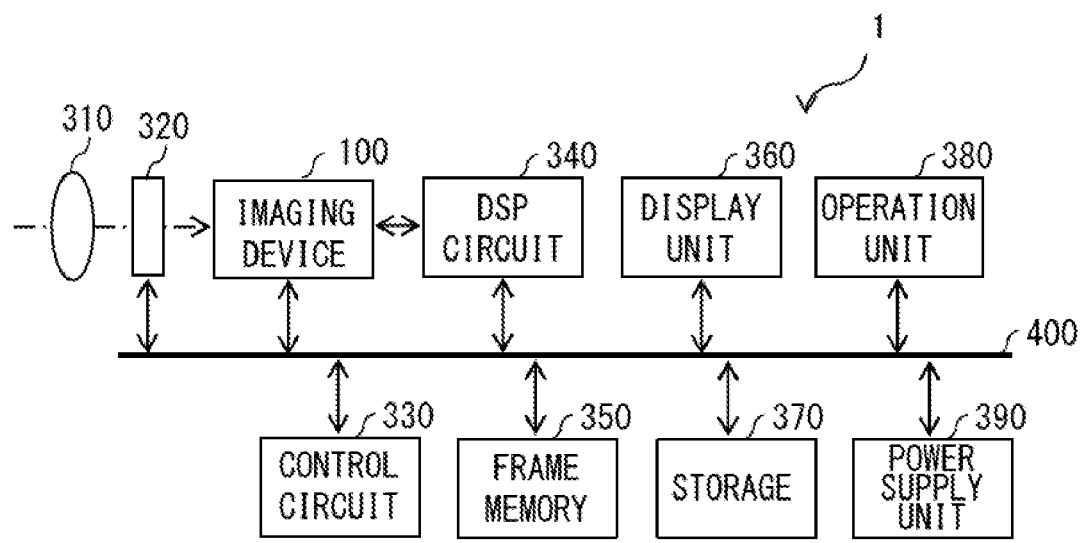
FIG. 9 is a schematic block diagram illustrating an exemplary configuration of an imaging system including the imaging device illustrated in FIG. 5.

The imaging device 100 according to the example embodiment and the modification examples described above may be applied to imaging devices such as digital still cameras or video cameras, portable devices with imaging functions, and various electronic apparatuses including imaging elements in their image capturing units, such as copying machines including imaging elements in their image reading units. Furthermore, the example embodiments of the present disclosure are also applicable to robots, drones, automobiles, medical equipment (endoscopes), or the like, that include the imaging device 100. Note that the imaging device 100 according to the example embodiment and the modification examples described above may be formed into one chip or a single packaged module including an imaging unit and a signal processor or an optical system with an imaging function. Hereinafter, an exemplary imaging system including the imaging device 100 according to any of the example embodiments and the modification examples described above is described with reference to FIG. 9. FIG. 9 is a block diagram illustrating an exemplary configuration of an imaging system 1 including the imaging device 100 according to any of the example embodiments and the modification examples described above.

As illustrated in FIG. 9, the imaging system 1 includes, for example, the imaging device 100 according to any of the example embodiments and the modification examples described above, an optical system 310, a shutter device 320, a control circuit 330, a DSP circuit 340, a frame memory 350, a display unit 360, a storage 370, an operation unit 380, and a power supply unit 390. In the imaging system 1, the imaging device 100 according to any of the example embodiments and the modification examples described above, the DSP circuit 340, the frame memory 350, the display unit 360, the storage 370, the operation unit 380, and the power supply unit 390 are coupled to each other via a bus line 400. The DSP circuit 340 corresponds to a specific but non-limiting example of the application processor 200 according to any of the example embodiments and the modification examples described above.

The optical system 310 includes one or more lenses. The optical system 310 guides light (incident light) received from a subject to the imaging device 100 to focus the light on a light receiving surface of the imaging device 100. The shutter device 320 is disposed between the optical system 310 and the imaging device 100. The shutter device 320 controls the light irradiation time period and the light shielding time period with respect to the imaging device 100 under the control of the control circuit 330. The imaging device 100 accumulates signal charges for a certain period of time depending on the light focused on the light receiving surface through the optical system 310 and the shutter device 320. The signal charges accumulated in the imaging device 100 are transferred as a pixel signal (image data) to the DSP circuit 340 on the basis of a drive signal (timing signal) supplied from the control circuit 330. That is, the imaging device 100 receives image light (incident light) passing through the optical system 310 and the shutter device 320, and outputs a pixel signal corresponding to the received image light (incident light) to the DSP circuit 340. The control circuit 330 outputs a drive signal for controlling the transfer operation of the imaging device 100 and the shutter operation of the shutter device 320 to drive the imaging device 100 and the shutter device 320.

The DSP circuit 340 is a signal processing circuit that processes the pixel signal (image data) outputted from the imaging device 100. The frame memory 350 temporarily holds the image data processed by the DSP circuit 340 on a frame unit basis. The display unit 360 is, for example, a display panel such as a liquid crystal panel or an organic electroluminescent (EL) panel. The display unit 360 displays a moving image or a still image captured by the imaging device 100. The storage 370 records the image data of a moving image or a still image captured by the imaging device 100 on a recording medium, such as a semiconductor memory or a hard disk. The operation unit 380 issues operation commands for various functions of the imaging system 1 in accordance with operations performed by the user. The power supply unit 390 supplies the imaging device 100, the DSP circuit 340, the frame memory 350, the display unit 360, the storage 370, and the operation unit 380 with electric power for operating these components as appropriate.

In the application example, the imaging device 100 according to any of the example embodiments and the modification examples is applied to the imaging system 1. Using such a power-saving imaging device 100, it is possible to provide the imaging system 1 that makes it possible to save the power consumption.

Although the present disclosure has been described with reference to the example embodiments and their modification examples, and application examples, the present disclosure should not be limited to the foregoing embodiment and the like, and various modifications may be made. It is to be noted that the effects described herein are merely illustrative. The effect of the present disclosure should not be limited to the effects described herein. The present disclosure may have other effects than those described herein.

The present disclosure may have at least the following configurations.

(1)
An imaging device including:
a controller configured to control an imaging unit, on the basis of a command and data that are received from a host in accordance with an I2C/I3C communication protocol;
a power supply configured to supply a voltage to a digital block of the controller, the digital block being configured to be subjected to dynamic voltage frequency scaling within one-frame operation; and
a regulator and a switch that are provided between the digital block and the power supply, and coupled in parallel with each other.

(2)
The imaging device according to (1), in which the regulator includes a low dropout that includes:
a circuit configured to output a second voltage that is lower than a first voltage to be supplied from the power supply; and
a circuit configured to switch between the first voltage and the second voltage as an output voltage.

(3)
The imaging device according to (2), in which the controller is configured to execute the dynamic voltage frequency scaling within the one-frame operation by controlling setting of the output voltage of the low dropout and by controlling on and off of the switch.

(4)
The imaging device according to (3), in which, upon executing the dynamic voltage frequency scaling within the one-frame operation, the controller is configured to:
change a frequency of a clock signal to be used in the controller from high to low;
change the switch from on to off, after changing the frequency of the clock signal from high to low; and
change the setting of the output voltage of the low dropout from the first voltage to the second voltage, following the change of the switch from on to off.

(5)
The imaging device according to (4), in which, upon executing the dynamic voltage frequency scaling within the one-frame operation, the controller is configured to:
change the setting of the output voltage of the low dropout from the second voltage to the first voltage after a predetermined period has elapsed from the change in the setting of the output voltage of the low dropout from the first voltage to the second voltage;
change the switch from off to on, following the change in the setting of the output voltage of the low dropout from the second voltage to the first voltage; and
change the frequency of the clock signal from low to high.

(6)
The imaging device according to any one of (1) to (5), in which the digital block, the regulator, and the switch are provided in a single chip.

(7)
An imaging method including:
providing a controller configured to control an imaging unit, on the basis of a command and data that are received from a host in accordance with an I2C/I3C communication protocol; and
supplying a voltage to a digital block of the controller via a regulator and a switch that are coupled in parallel with each other, the digital block being configured to be subjected to dynamic voltage frequency scaling within one-frame operation.

(8)
The imaging method according to (7),
in which the regulator includes a low dropout that includes: a circuit configured to output a second voltage that is lower than a first voltage to be supplied from the power supply; and a circuit configured to switch between the first voltage and the second voltage as an output voltage, and
in which the imaging method further includes executing the dynamic voltage frequency scaling within the one-frame operation by controlling setting of the output voltage of the low dropout and by controlling on and off of the switch.

(9)
The imaging method according to (8), in which the executing the dynamic voltage frequency scaling within the one-frame operation includes:
changing a frequency of a clock signal to be used in the controller from high to low;
changing the switch from on to off, after changing the frequency of the clock signal from high to low; and
changing the setting of the output voltage of the low dropout from the first voltage to the second voltage, following the changing of the switch from on to off.

(10)
The imaging method according to (9), in which the executing the dynamic voltage frequency scaling within the one-frame operation includes:
changing the setting of the output voltage of the low dropout from the second voltage to the first voltage after a predetermined period has elapsed from the changing in the setting of the output voltage of the low dropout from the first voltage to the second voltage;
changing the switch from off to on, following the changing in the setting of the output voltage of the low dropout from the second voltage to the first voltage; and
changing the frequency of the clock signal from low to high.

(11)
An electronic apparatus including:
a host configured to communicate in accordance with an I2C/I3C communication protocol;
a controller configured to control an imaging unit, on the basis of a command and data that are received from the host in accordance with the I2C/I3C communication protocol;
a power supply configured to supply a voltage to a digital block of the controller, the digital block being configured to be subjected to dynamic voltage frequency scaling within one-frame operation; and
a regulator and a switch that are provided between the digital block and the power supply, and coupled in parallel with each other.

In the imaging device, the imaging method, and the electronic apparatus according to at least one embodiment of the disclosure, the voltage is supplied, via the regulator and the switch that are coupled in parallel with each other, to the digital block (the power supply domain) of the controller that controls the imaging unit. The digital block is to be subjected to the intra-frame DVFS. Accordingly, it is possible to achieve an efficient power consumption reduction based on DVFS.

Although the disclosure is described hereinabove in terms of example embodiments and application examples, it is not limited thereto. It should be appreciated that variations may be made in the example embodiments and application examples described herein by persons skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. For example, in this disclosure, the use of the terms first, second, etc. do not denote any order or importance, but rather the terms first, second, etc., are used to distinguish one element from another. As used herein, the singular form "a", "an" and "the" include plural references unless the context clearly dictates otherwise. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. An imaging device comprising:
a controller configured to control an imaging unit, on a basis of a command and data that are received from a host in accordance with an I2C/I3C communication protocol;
a power supply configured to supply a voltage to a digital block of the controller, the digital block being configured to be subjected to dynamic voltage frequency scaling within one-frame operation; and
a regulator and a switch that are provided between the digital block and the power supply, and coupled in parallel with each other.

2. The imaging device according to claim 1, wherein the regulator comprises a low dropout that includes:
a circuit configured to output a second voltage that is lower than a first voltage to be supplied from the power supply; and
a circuit configured to switch between the first voltage and the second voltage as an output voltage.

3. The imaging device according to claim 2, wherein the controller is configured to execute the dynamic voltage frequency scaling within the one-frame operation by controlling setting of the output voltage of the low dropout and by controlling on and off of the switch.

4. The imaging device according to claim 3, wherein, upon executing the dynamic voltage frequency scaling within the one-frame operation, the controller is configured to:
change a frequency of a clock signal to be used in the controller from high to low;
change the switch from on to off, after changing the frequency of the clock signal from high to low; and
change the setting of the output voltage of the low dropout from the first voltage to the second voltage, following the change of the switch from on to off.

5. The imaging device according to claim 4, wherein, upon executing the dynamic voltage frequency scaling within the one-frame operation, the controller is configured to:
change the setting of the output voltage of the low dropout from the second voltage to the first voltage after a predetermined period has elapsed from the change in the setting of the output voltage of the low dropout from the first voltage to the second voltage;
change the switch from off to on, following the change in the setting of the output voltage of the low dropout from the second voltage to the first voltage; and
change the frequency of the clock signal from low to high.

6. The imaging device according to claim 1, wherein the digital block, the regulator, and the switch are provided in a single chip.

7. An imaging method comprising:
providing a controller configured to control an imaging unit, on a basis of a command and data that are received from a host in accordance with an I2C/I3C communication protocol; and
supplying a voltage to a digital block of the controller via a regulator and a switch that are coupled in parallel with each other, the digital block being configured to be subjected to dynamic voltage frequency scaling within one-frame operation.

8. The imaging method according to claim 7,
wherein the regulator comprises a low dropout that includes: a circuit configured to output a second voltage that is lower than a first voltage to be supplied from the power supply; and a circuit configured to switch between the first voltage and the second voltage as an output voltage, and
wherein the imaging method further comprises executing the dynamic voltage frequency scaling within the one-frame operation by controlling setting of the output voltage of the low dropout and by controlling on and off of the switch.

9. The imaging method according to claim 8, wherein the executing the dynamic voltage frequency scaling within the one-frame operation comprises:
changing a frequency of a clock signal to be used in the controller from high to low;
changing the switch from on to off, after changing the frequency of the clock signal from high to low; and
changing the setting of the output voltage of the low dropout from the first voltage to the second voltage, following the changing of the switch from on to off.

10. The imaging method according to claim 9, wherein the executing the dynamic voltage frequency scaling within the one-frame operation comprises:

changing the setting of the output voltage of the low dropout from the second voltage to the first voltage after a predetermined period has elapsed from the changing in the setting of the output voltage of the low dropout from the first voltage to the second voltage;

changing the switch from off to on, following the changing in the setting of the output voltage of the low dropout from the second voltage to the first voltage; and changing the frequency of the clock signal from low to high.

11. An electronic apparatus comprising:

a host configured to communicate in accordance with an I2C/I3C communication protocol;

a controller configured to control an imaging unit, on a basis of a command and data that are received from the host in accordance with the I2C/I3C communication protocol;

a power supply configured to supply a voltage to a digital block of the controller, the digital block being configured to be subjected to dynamic voltage frequency scaling within one-frame operation; and a regulator and a switch that are provided between the digital block and the power supply, and coupled in parallel with each other.

* * * * *